April 17, 1928.  1,666,509
H. G. A. SCHLOSSARECK
FLYTRAP
Filed June 28, 1926
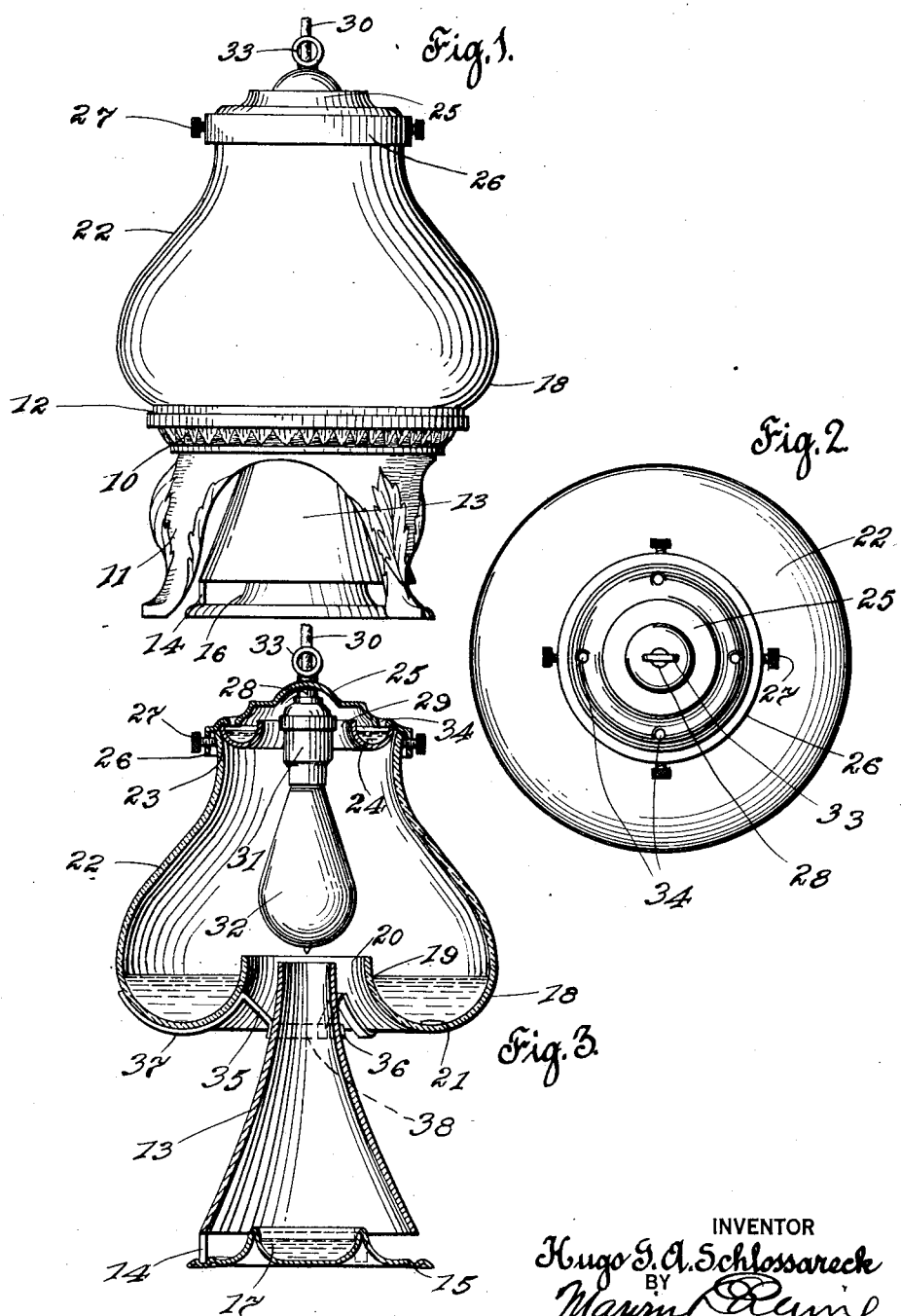
INVENTOR
Hugo G. A. Schlossareck
BY
ATTORNEY Patented Apr. 17, 1928.

1,666,509

UNITED STATES PATENT OFFICE.

HUGO G. A. SCHLOSSARECK, OF YONKERS, NEW YORK.

FLYTRAP.

Application filed June 28, 1926. Serial No. 118,916.

This invention relates to devices for catching flies and like insects and is an improvement over the patent issued to me December 22, 1925 and numbered 1,566,619.

One of the objects of this disclosure is to provide means whereby insects may be attracted to the device and so trapped.

A further object is in the provision of an appliance capable of bringing death to insects by drowning.

A still further aim is to provide means whereby a fly does not have to go to the top of the device to be trapped, but instead may be caught as soon as it leaves the surface on which the apparatus rests.

These and other objects, which will become apparent as the description progresses, are accomplished by the novel construction, combination and arrangement of parts, hereinafter described and illustrated in the accompanying drawing, forming a material part of this disclosure, and in which:—

Figure 1 is a side elevational view of an embodiment of the invention.

Figure 2 is a top plan view thereof.

Figure 3 is a vertical sectional view of the same showing a modified support.

Referring more in detail to the drawing:—

The numeral 10 generally designates an ornamental circular base having an opening centrally therein; there being a plurality of legs 11 extending from the base.

Fixed on the top of the base 10 is a thin marginal plate 12, the upper surface of which is concave and extending into the opening from the base is a funnel 13 extending thereabove.

Fixed to the lower wide end of the funnel 13 are legs 14 engaging in notches 15 formed in the bottom of converging walls 16; the walls reaching to a plane level with the lower end of the funnel, there being a cup 17 formed integrally with the walls to retain a liquid.

Mounted on the concave surface of the plate 12 is an annular base 18 curved upwardly as at 19 to form a central opening in the base receptive of the top of the funnel 13.

This construction presents an annular channel 21, the outer walls of which are convergingly curved as at 22 and which upon reaching the top 23 is curved to form an interior annular channel 24.

Resting on the top 23 is a cover 25 having a downwardly extending flange 26 in which is set a plurality of thumb screws 27 to abut against the portion 22 and so keep the cover in place.

Passing through a collar 28 set in the cover 25 and an opening 29 formed by the inner walls of the channel 24 is a conducting cord 30 connecting with a socket 31 in which may be placed an electric bulb 32 to attract insects to the trap.

The cover 25 may be lifted by a ring 33 fixed to the top thereof and formed in the rising walls of the cover and directed to the channel 24, is a plurality of downward extending open nipples 34.

In Figure 3, instead of the base 10 and legs 11 being used to support the globe, there is substituted, a plurality of brackets 35 formed on a ring 36, the brackets having curved elements 37 to receive the annular base 18; the ring being slipped over the top of the funnel B and rest thereon, as at 38.

The globe portion of the device is preferably made of colored glass, so as to give the light a hazy glow and so attract insects, which eventually find their way into the globe by the nipples 34 or the opening 20 or the cup 17 by the funnel.

The annular channels 21 and 24 are partially filled with salt water so that an insect trapped therein would drop into the liquid and would be drowned.

From the foregoing, it may be seen that an effective insect trap has been disclosed to reduce the pests so well known during certain seasons of the year.

Having thus described my invention, what I claim as new and desire to secure by Letters Patent, is:—

A fly trap comprising a base having a central liquid holding compartment, a hollow conical support carried in spaced relation above said base, a transparent globe having a bottom opening spaced from the entering end of said support, means on said support to removably engage the globe thereon, said globe having a liquid containing compartment, an annular receptacle carried at the upper end of said globe, a cap thereover, means for detachably engaging said cap, and a lighting means suspended from said cap within said globe.

In witness whereof I have affixed my signature.

HUGO G. A. SCHLOSSARECK.